United States Patent [19]

Hummerich et al.

[11] Patent Number: 4,861,826
[45] Date of Patent: Aug. 29, 1989

[54] AQUEOUS POLYURETHANE ADHESIVE DISPERSIONS

[75] Inventors: Rainer Hummerich, Worms; Michael Kerber, Weinheim; Lothar Maempel, Bruehl; Peter Weyland, Frankenthal, all of Fed. Rep. of Germany

[73] Assignee: BASF Aktiengesellschaft, Ludwigshafen, Fed. Rep. of Germany

[21] Appl. No.: 133,378

[22] Filed: Dec. 15, 1987

[30] Foreign Application Priority Data

Dec. 20, 1986 [DE] Fed. Rep. of Germany ....... 3643791

[51] Int. Cl.$^4$ ...................... C08L 75/12; C08L 75/06
[52] U.S. Cl. ..................................... 524/839; 524/840
[58] Field of Search ................................ 524/839, 840

[56] References Cited

U.S. PATENT DOCUMENTS

| | | |
|---|---|---|
| 3,479,310 | 0/1969 | Dietrich et al. . |
| 3,826,769 | 7/1974 | Carlson . |
| 3,959,329 | 5/1976 | Dieterich . |
| 3,959,348 | 5/1976 | Reiff . |
| 3,993,614 | 11/1976 | Carlson . |
| 3,998,870 | 12/1976 | Carlson . |
| 3,998,871 | 12/1976 | Carlson . |
| 4,056,564 | 11/1977 | Wolf . |
| 4,144,267 | 3/1979 | Dieterich . |
| 4,501,852 | 2/1985 | Markusch ............................ 524/839 |
| 4,528,323 | 7/1985 | Lorenz ................................ 524/839 |
| 4,623,416 | 11/1986 | Henning ............................. 524/839 |
| 4,670,100 | 6/1987 | Henning ............................. 524/839 |
| 4,701,480 | 10/1987 | Markusch ........................... 524/839 |
| 4,724,095 | 3/1988 | Markusch ........................... 524/839 |

FOREIGN PATENT DOCUMENTS 1455554 11/1976 United Kingdom .

OTHER PUBLICATIONS

*Ang. Chem.* 82 (1970) p. 53 et seq.
*Ang. Makromol. Chem.* 98 (1981) p. 133 et seq.

*Primary Examiner*—C. Warren Ivy
*Attorney, Agent, or Firm*—Oblon, Spivak, McClelland, Maier & Neustadt

[57] ABSTRACT

Aqueous dispersions of polyurethanes consisting of
(a) organic polyisocyanates,
(b) polyesterpolyols having a molecular weight of from 500 to 5,000,
(c) organic hydroxy compounds having a molecular weight of from 62 to 400 and two terminal groups which are reactive to isocyanate groups, as chain extenders, and
(d) compounds containing ionic groups or groups which can be converted to ionic groups and one or more isocyanate groups or a hydroxyl or amino group which is reactive to isocyanate groups, which contain from 0.05 to 2 meq of ionic groups incorporated into the polyurethane via (d) per g of polyurethane are particularly suitable for adhesives when the chain extenders (c) are incorporated in an amount of from 1.5 to 8 moles per mole of polyols, and a minor amount of (a) can be replaced with monoisocyanates, and a minor amount of (b) with polyetherpolyols.

6 Claims, No Drawings

AQUEOUS POLYURETHANE ADHESIVE DISPERSIONS

The present invention relates to aqueous dispersions of polyurethanes which, because of their special composition, are very useful as adhesives which give a strong bond at elevated temperatures and simultaneously have good initial and final strengths and activation properties. The polyurethanes are characterized by a high chain extender content, based on the polyol component and compared with prior art products.

Aqueous dispersions of polyurethanes are known and are described in, for example, U.S. Pat. No. 3,479,310 and Angew. Chem. 82 (1970), 53 and Angew. Makromol. Chem. 98 (1981), 133.

The products are suitable for various fields, including bonding of any substrates. However, polyurethane dispersion adhesives to date have an unsatisfactory combination of activation properties, initial and final strength and high temperature strength of the bond and, in view of the high requirements today, are suitable for many applications only under certain conditions. The polyurethane dispersions described in DE-A 28 04 609 also do not meet the requirements as adhesives for rubber.

Although the adhesive dispersions claimed in U.S. Pat. No. 4,623,416 reach high final strengths, there has been no detectable progress with regard to initial adhesion and high-temperature strength in combination with activation properties conforming to practical requirements.

In particular, mechanical stress at elevated temperatures leads to partial parting of the bond in the case of the known adhesives, including those based on polyurethane dispersions. It is known that the strength of the bonds when subjected to a load at elevated temperatures can be increased by adding polyisocyanates having a fairly high functionality, this being achieved even where aqueous dispersions are used. However, the disadvantage of this procedure in the case of dispersions is that the polyisocyanates frequently cannot be adequately incorporated into the aqueous medium. Moreover, a formulation of this type has only a limited shelf life since the viscosity of the product may increase shortly after the addition of the isocyanate, and the adhesive mixture coagulates or gels after a few hours and thus becomes completely useless. Furthermore, the adhesive has to be mixed from two components directly before use at the place of use. This easily gives rise to unsatisfactory adhesive bonds, for example through inexact metering in the case of fairly small batches of adhesive and through insufficient mixing of the components in the case of larger batches.

It is an object of the present invention to provide aqueous dispersions of polyurethanes which, as adhesives, lead to adhesive bonds having improved combinations of high temperature strength and peel strength coupled with good activation properties of the adhesive film, without the addition of a reactive second component.

We have found that this object is achieved by aqueous dispersions of polyurethanes consisting of (a) organic polyisocyanates, with or without minor amounts of organic monoisocyanates, (b) organic polyhydroxy compounds having a molecular weight of from 500 to 5,000 in the form of polyesterpolyols and, if required, up to 40% by weight, based on the total amount of (b), of polyetherpolyols having the same molecular weight range, (c) organic hydroxy compounds as chain extenders which are free of ionic groups and have a molecular weight of from 62 to 400 and two terminal groups which are reactive to isocyanates, (d) compounds containing ionic groups or groups which can be converted to ionic groups and one or more isocyanate groups or a hydroxyl or amino group which is reactive to isocyanate groups, (e) with or without monofunctional polyetherols and/or diols which have polyether side segments and each contain not less than 40% of polyethylene oxide segments in the ether chain, and (f) with or without chain extenders which carry two or more amine groups and are free of ionic groups, which contain from 0.05 to 2 meq of ionic groups incorporated into the polyurethane via (d) per g of polyurethane and may contain up to 10% by weight, based on the polyurethane, of polyethylene oxide terminal and/or side segments which are incorporated in the polyurethane via (e), wherein the chain extenders (c) are incorporated in an amount of from 1.5 to 8 moles per mole of polyesterol and, where relevant, polyetherol (b).

The novel polyurethane dispersions surprisingly give bonds which, in spite of good activation properties (80° C.) exhibit good high temperature strengths. At the same time, the adhesive bonds have very good peel strengths. This combination of properties has not been achieved to date without crosslinking agents.

Suitable polyisocyanates are organic compounds which possess two or more free isocyanate groups. Diisocyanates $X(NCO)_2$ are preferably used, X being an aliphatic hydrocarbon radical of 4 to 12 carbon atoms, a cycloaliphatic hydrocarbon radical of 6 to 15 carbon atoms, an aromatic hydrocarbon radical of 6 to 15 carbon atoms or an araliphatic hydrocarbon radical of 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanato-2,2-dicyclohexylmethyl, (4,4'-diisocyanatodicyclohexyl)-propane, 1,4-diisocyanatobenzene, 2,4-diisocyanatotoluene, 2,6-diisocyanatotoluene, 4,4'-diisocyanatodiphenylmethane, p-xylylene diisocyanate and mixtures consisting of these compounds, in particular mixtures of aliphatic or cycloaliphatic and aromatic diisocyanates in a molar ratio of from 1:4 to 5:1. It is also possible to use proportionate amounts of polyisocyanates having a higher functionality and conventionally used in polyurethane chemistry or conventional modified polyisocyanates, for example those containing carbodiimide, allophanate, isocyanurate, urethane and/or biuret groups.

If required, monoisocyanates, eg. phenyl isocyanate, hexyl isocyanate or dodecyl isocyanate, may also be used in the preparation of the polyurethanes, in minor amounts, ie. in amounts of up to 10 NCO equivalent %; however, premature chain termination must be prevented by the simultaneous use of components having a functionality higher than two.

The organic polyhydroxy compounds (b) having a molecular weight of from 500 to 5,000 are polyesterpolyols, if necessary mixed with up to 40% by weight (based on the mixture) of polyetherpolyols.

Suitable polyesterpolyols having molecular weights of from 500 to 5,000, in particular from 800 to 4,000, preferably from 1,400 to 3,000, are polyesterpolyols based on dicarboxylic acids, in particular the corresponding polyesterdiols, and/or polyesterols based on lactones. The polyesterpolyols, in particular the polyesterdiols, are the conventional reaction products of polyhydric, preferably dihydric and if desired additionally trihydric, alcohols with polybasic, preferably dibasic, carboxylic acids. Instead of the free polycarboxylic acids, it is also possible to use the corresponding polycarboxylic anhydrides or the corresponding polycarboxylates of lower alcohols or mixtures of these for the preparation of the polyesters. The polycarboxylic acids may be aliphatic, cycloaliphatic, aromatic or heterocyclic and may be substituted, for example by halogen atoms, and/or unsaturated. Specific examples of these are succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids, such as oleic acid, dimethyl terephthalate and bisglycol terephthlate. Examples of suitable polyhydric alcohols are ethylene glycol, propylene 1,2-glycol and 1,3-glycol, butane-1,4-diol and -2,3-diol, hexane-1,6-diol, octane-1,8-diol, neopentylglycol, cyclohexane dimethanol(1,4-bishydroxymethylcyclohexane), 2-methylpropane-1,3-diol, glycerol, trimethylolpropane, hexane-1,2,6-triol, butane-1,2,4-triol and trimethylolethane, as well as diethylene glycol, triethylene glycol, tetraethylene glycol, polyethylene glycol, dipropylene glycol, polypropylene glycol, dibutylene glycol and polybutylene glycol. The polyesters may also contain terminal carboxyl groups. Preferably used polyesterdiols based on dicarboxylic acids are those whose dicarboxylic acid component contains not less than 50 carboxyl equivalent % of adipic acid, particularly preferably exclusively adipic acid, and whose polyol component preferably contains not less than 50 hydroxyl equivalent % of hexane-1,6-diol or butane-1,4-diol, particularly preferably exclusively one of the said diols.

Suitable polyesterols based on lactones are homopolymers or copolymers of lactones, preferably difunctional adducts, containing terminal hydroxyl groups, of lactones or lactone mixtures, eg. ε-caprolactone, β-propiolactone, γ-butyrolactone and/or methyl-ε-caprolactone, with suitable difunctional initiator molecules, for example the low molecular weight, dihydric alcohols mentioned above as components for the polyesterpolyols. The corresponding polymers of ε-caprolactone are particularly preferred. Lower polyesterdiols or polyetherdiols too may be used as initiators for the preparation of the lactone polymers. Regarding the suitability of the lactone polymers, it is important that they consist of not less than 50% by weight of polymerized lactones or ω-hydroxycarboxylic acids which have been subjected to polycondensation and correspond to the lactones. Instead of the polymers of lactones, the corresponding, chemically equivalent polycondensates of the hydroxycarboxylic acids corresponding to the lactones may also be used.

Mixtures of the abovementioned polyesterpolyols can also be employed.

The polyetherpolyols, in particular polyetherdiols, which may be used as a mixture with the polyesterpolyols, are the products which are known per se from polyurethane chemistry and can be prepared, for example, by polymerization of epoxides, such as ethylene oxide, propylene oxide, butylene oxide, tetrahydrofuran, styrene oxide or epichlorohydrin, with themselves, for example in the presence of $BF_3$, or by an addition reaction of these epoxides, if necessary as a mixture with one another or in succession, with initiator components having reactive hydrogen atoms, such as alcohols or amines, eg. water, ethylene glycol, propylene 1,3-glycol or 1,2-glycol, 4,4'-dihydroxydiphenylpropane or aniline.

The novel components (c) are organic dihydroxy compounds which are free of ionic groups and may contain ether or ester groups and/or difunctional aminoalcohols having a molecular weight of from 62 to 400, preferably from 62 to 150. According to the invention, these compounds are used in an amount of from 1.5 to 8, preferably from 2 to 6, in particular from 3 to 5, moles per mole of polyhydroxy compound (b). Examples of these are ethylene glycol, propylene glycol, propane-1,3-diol, neopentyl glycol and particularly butane-1,4-diol and hexane-1,6-diol. Low molecular weight polyesterdiols, eg. bis(hydroxyethyl)adipate. or low molecular weight diols containing ether groups, such as diethylene glycol, triethylene glycol, tetraethylene glycol, dipropylene glycol, tripropylene glycol or tetrapropylene glycol, may also be used.

Examples of amino alcohols are ethanolamine, isopropanolamine, methylethanolamine, aminoethoxyethanol, 3-aminopropanol, 2-aminobutan-1-ol and neopentanolamine.

Components (d) which are used are compounds which contain one or more, preferably two, isocynate groups or one or more, preferably two, groups which are reactive to isocyanate groups, and furthermore ionic groups or potential ionic groups which can be converted to ionic groups by a simple neutralization or quaternization reaction. These include, for example, isocyanates modified with (potential) ionic groups, as described in U.S. Pat. Nos. 3,826,769, 3,993,614, 3,998,870, 3,998,871, 3,959,329, 3,959,348 and 4,144,267, for example aromatic polyisocyanates containing free sulfo groups, particularly polyisocyanates obtainable from 2,4-diisocyanatotoluene or 4,4'-diisocyanatodiphenylmethane. Isocyanates which react as quaternizing agents toward amines, eg. chlorohexyl isocyanate, m-chloromethylphenyl isocyanate and 2,4-diisocyanatobenzyl chloride, or isocyanates containing alkyl sulfonate groups, eg. methyl 4-isocyanatobenzenesulfonate, can also be used for the preparation of the novel polyurethane dispersions, as compounds having potential ionic groups, since reaction of these compounds with, for example, tertiary amines likewise introduces cationic groups, bonded by homopolar bonds, into the polyadduct.

However, the cationic and anionic groups are preferably introduced by the concomitant use of compounds possessing (potential) cationic groups and having hydrogen atoms which are reactive to isocyanate groups, and compounds possessing (potential) anionic groups and having hydrogen atoms which are reactive to isocyanate groups. This group of compounds includes, for example, polyethers having tertiary nitrogen atoms and preferably two terminal hydroxyl groups, as are obtainable in a conventional manner, for example, by alkoxylation of amines having two hydrogen atoms bonded to the amine nitrogen, for example N-methylamine, aniline or N,N'-dimethylhydrazine. Such polyethers generally have a molecular weight of from 500 to 6,000. Preferably, however, the ionic groups are introduced by the concomitant use of relatively low molecular weight compounds having (potential) ionic groups and groups which are reactive to isocyanate groups. Examples of these are described in U.S. Pat. Nos. 3,479,310 and 4,056,564 and British Pat. No. 1,455,554. Dihydroxyphosphonates, such as the sodium salt of ethyl 2,3-dihydroxypropanephosphonate or the corresponding sodium salt of the unesterified phosphonic acid, may also be used as ionic components.

Particularly preferred (potential) ionic components (d) are N-alkyldialkanolamines, eg. N-methyldiethanolamine or N-ethyldiethanolamine, diaminosulfonates, such as the Na salt of N-(2-aminoethyl)-2-aminoethanesulfonic acid, dihydroxysulfonates, dihydroxycarboxylic acids, such as dimethylolpropionic acid, diaminocarboxylic acids and diaminocarboxylates, such as lysine or the Na salt of N-(2-aminoethyl)-2-aminoethanecarboxylic acid, and diamines having one or more additional tertiary amine nitrogen atoms, eg. N-methyl-bis-(3-aminopropyl)amine.

Conversion of some or all of the potential ionic groups, which may initially be incorporated in the polyadduct, into ionic groups can be carried out in a conventional manner by neutralization of the potential anionic and cationic groups or by quaternization of tertiary amine nitrogen atoms.

Neutralization of potential anionic groups, eg. carboxyl groups, is carried out using inorganic and/or organic bases, such as sodium hydroxide, potassium hydroxide, potassium carbonate, sodium bicarbonate, ammonia or primary, secondary and in particular tertiary amines, eg. triethylamine and dimethylaminopropanol.

For conversion of the potential cationic groups, for example the tertiary amino groups, into the corresponding cations, eg. ammonium groups, suitable neutralizing agents are inorganic or organic acids, eg. hydrochloric acid, acetic acid, fumaric acid, maleic acid, lactic acid, tartaric acid, oxalic acid or phosphoric acid, and suitable quaternizing agents are, for example, methyl chloride, methyl iodide, dimethylsulfate, benzyl chloride, ethyl chloroacetate or bromoacetamide. Other suitable neutralizing and quaternizing agents are described in U.S. Pat. No. 3,479,310, column 6.

This neutralization or quanternization of the potential ionic groups can be carried out before or during the isocyanate polyaddition reaction, but is preferably effected after the said reaction.

The amount of component (d), taking into account the degree of neutralization or of quaternization in the case of components containing potential ionic groups, should be chosen so that the polyurethanes contain from 0.05 to 2, preferably from 0.07 to 1.0, particularly preferably from 0.1 to 0.7, meq of ionic groups per g of polyurethane.

The components (e), which may or may not be present, are monohydric polyetheralcohols and/or organic dihydroxy compounds having polyether side chains, each of these compounds having a molecular weight of from 500 to 10,000, preferably from 1,000 to 3,000.

Monohydric polyetheralcohols are obtainable by alkoxylation of monohydric initiator molecules, for example methanol, ethanol or n-butanol, ethylene oxide or mixtures of ethylene oxide with other alkylene oxides, in particular propylene oxide, being used as the alkoxylating agent. Where alkylene oxide mixtures are used, however, they contain preferably not less than 40, particularly preferably not less than 65, mol % of ethylene oxide.

Organic dihydroxy compounds having polyether side chains contain not less than 40, preferably not less than 65, mol % of ethylene oxide units (in particular in addition to propylene oxide units) in the polyether chain. Examples of these are described in, for example, U.S. Pat. Nos. 3,905,929 and 4,238,387.

Other suitable substances of this type are polyether-1,3-diols, for example trimethylolpropane which is formally alkoxylated at one group, $C_2H_5-C(CH_2OH)_2-CH_2OXR$, where X is a polyalkylene oxide chain of the type stated above for monohydric polyetheralcohols, which is terminated by an alkyl radical R, eg. $CH_3$.

By means of component (e), ethylene oxide segments present in terminal and/or side polyether chains may thus be incorporated into the polyurethane, the said segments influencing the hydrophilic character of the polyurethane, in addition to the ionic groups.

The compounds of the type mentioned by way of example, having ethylene oxide units within terminal and/or side polyether chains, are used, if at all, in amounts such that from 0 to 10, preferably from 0 to 5, % by weight of the said ethylene oxide units are present in the polyurethanes in the novel polyurethane dispersions. The total amount of hydrophilic structural units (ionic groups and ethylene oxide units of the last-mentioned type) must, however, always be chosen so that the dispersability of the polyurethanes in water is ensured.

Components (f), which may or may not be used, are difunctional or polyfunctional amine chain extenders or crosslinking agents having a molecular weight of from 32 to 500, preferably from 60 to 300 and possessing no tertiary amino groups. Examples of these are diamines, such as ethylene diamine, hexamethylene diamine, piperazine, 2,5-dimethylpiperazine, 1-amino-3-aminomethyl-3,5,5-trimethylcyclohexane (isophorondiamine, IPDA), 4,4'-diaminodicyclohexylmethane, 1,4-diaminocyclohexane, 1,2-diaminopropane, hydrazine or hydrazine hydrate, or triamines, such as diethylenetriamine. They can be used in amounts of from 0 to 2.0 moles per mole of component (b), in particular for chain extension of prepolymers containing isocyanate groups before or, particularly in the case of triamines, after dispersing in water.

The amino-containing chain extenders may also be used in the blocked form, for example in the form of the corresponding ketimines (Canadian Pat. No. 1,129,128), ketazines (U.S. Pat. No. 4,269,748) or amine salts (U.S. Pat. No. 4,292,226). Oxazolidines too, as used, for example, in U.S. Pat. No. 4,192,937, are blocked diamines which may be used for chain extension of the isocyanate prepolymers for the preparation of the novel polyurethane dispersions. Where blocked diamines of this type are used, they are generally mixed with the isocyanate prepolymer in the absence of water, and this mixture is then mixed with the dispersion water or some of the dispersion water, so that the corresponding diamines are liberated hydrolytically as intermediates.

Other examples of compounds which can be used as components (a), (b) or (c) in the preparation of the novel dispersions are described in, for example, High Polymers, Vol. XVI, Polyurethanes, Chemistry and Technology, by Saunders-Frisch, Interscience Publishers, New York, London, Volume I, 1962, pages 32–42 and pages 44–54, and Volume II, 1964, pages 5–6 and 198–199, and in Kunststoff-Handbuch, Volume VII, Vieweg-Höchtlen, Carl-Hanser-Verlag, Munich, 1966, for example on pages 45–71.

The concomitant use of compounds which are trifunctional or of higher functionality for the purposes of the isocyanate polyaddition reaction in small amounts to achieve a particular degree of branching is just as possible as the abovementioned concomitant use of polyisocyanates which are trifunctional or of higher functionality. Monohydric alcohol, eg. n-butanol or n-dodecanol and stearyl alcohol, can also be used in small amounts.

The isocyanate groups and the hydroxyl and amino groups capable of reacting with isocyanate should be used in roughly equivalent molar ratios. The ratio of the number of isocyanate groups to the total number of hydrogen atoms capable of reacting with isocyanate should be from 0.9 to 1.2, preferably from 0.95 to 1.1, in particular from 0.98 to 1.03.

To accelerate the reaction of the diisocyanates the conventional catalysts, such as dibutyltin dilaurate, tin(II) octoate or 1,4-diazabicyclo(2.2.2)octane, may be present.

The aqueous polyurethane dispersions are prepared by a conventional method. For example, a prepolymer having terminal isocyanate groups can first be prepared from the components (a), (b), (c) and, if required, (e) in the melt or in the presence of an inert water-miscible solvent, such as acetone, tetrahydrofuran, methyl ethyl ketone or N-methylpyrrolidone. The reaction temperature is in general from 20° to 160° C., preferably from 50° to 100° C.

If a mixture of a (cyclo)aliphatic diisocyanate and an aromatic diisocyanate is used as the polyisocyanate (a), the diisocyanates are reacted either as a mixture with one another or in succession with the hydroxy compounds (b), (c) and, where relevant, (e). In the latter case, it is advantageous if the aromatic diisocyanate is employed first, followed by the (cyclo)aliphatic diisocyanate, in order to ensure that the reaction product contains middle segments of aromatic diisocyanate and chain extenders (c) and terminal (cyclo)aliphatic isocyanate groups. In the case of the stepwise reaction of the two diisocyanates, it is not important for the aromatic diisocyanate to be completely reacted before the addition of the (cyclo)aliphatic diisocyanate; instead, the (cyclo)aliphatic diisocyanate may frequently be added at as early a stage as when only some of the aromatic diisocyanate has reacted.

The isocyanate prepolymers thus obtained are subjected, if necessary after (further) dilution with solvents of the abovementioned type, preferably low boiling solvents having boiling points below 100° C., to chain extensions at from 20° to 80° C. by reaction with products possessing amine functional groups, of component (d) and, where relevant, (f), and are converted to the high molecular weight polyurethanes. The solution of the polyurethane which carries ionic groups as a result of incorporation of component (d) or may carry ionic groups after neutralization or quaternization is dispersed by stirring in water, after which the solvent is distilled off.

If products containing hydroxyl functional groups are used as component (d) carrying (potential) ionic groups, components (a), (b), (c), (d) and, where relevant, (e) are converted to a polyurethane or to an isocyanate prepolymer. In the former case, the polyurethane which carries ionic groups or may carry ionic groups after neutralization or quaternization, or a solution of the said polyurethane, is dispersed in water. However, the preferred route is via an isocyanate polymer which, as stated above, is reacted with amine chain extenders (d) and/or if required, (f) to give the high molecular weight polyurethane, which is dispersed in water.

The conversion of potential salt groups, eg. carboxyl groups or tertiary amino groups, to the corresponding ions is carried out by neutralization with a base or an acid or by quaternization of the tertiary amino groups prior to mixing with the water used for dispersing. It is also possible, for example, for the base required to neutralize the carboxyl groups or the acid required to neutralize the tertiary amino groups to be mixed with the water used for dispersing. It is furthermore possible for some or all of the potential salt groups present in the isocyanate prepolymer, for example carboxyl or tertiary amino groups, to be converted to salt groups before the reaction with amine chain extenders, by neutralization or quaternization.

It is also possible for isocyanate prepolymers carrying ionic groups or potential ionic groups to be dispersed in water, after neutralization or quaternization or with the addition of the base or acid as the neutralizing agent to the water used for dispersing in the case of prepolymers carrying potential ionic groups, and then to be reacted with the amine chain extenders or crosslinking agents (f) in the disperse phase to give the ready-prepared polyurethane.

The amount of water used for dispersing is generally such that aqueous polyurethane dispersions having a solids content of from 10 to 60%, preferably from 20 to 50%, are obtained.

It is furthermore possible to prepare the polyurethane dispersions by the melt dispersing method as described in U.S. Pat. No. 3,756,992; in this method, if the type and proportions of starting materials used are suitably chosen, it is merely necessary to ensure that the resulting polyurethanes fulfil the conditions according to the invention with respect to the content of ionic groups and of chain extender (c) which is essential to the invention.

The novel polyurethane dispersions can be used as such directly for the adhesive bonding of any substrates. In order to obtain specific properties, the novel dispersions may be mixed with other polymer dispersions. Furthermore, additives such as synthetic or natural resins, plasticizers, film-forming assistants, solvents (low boiling to high boiling) and fillers may be added.

They are useful for bonding rubber to rubber or to other materials in the shoe industry, for example for bonding the shoe upper and the sole, and in particular in automotive construction for bonding interior trim components. Adhesive bonding by means of the novel polyurethane dispersions is carried out by a conventional method of adhesives technology for processing aqueous dispersion or solution adhesives.

In the Examples which follow, percentages are by weight. The molecular weights stated therein were all determined via the hydroxyl number.

The adhesive properties of the dispersions are tested in accordance with DIN 53,273, in each case on the same styrene/butadiene polymer rubber sole material having a Shore A hardness of 90 (Nora test material from Freudenberg, Weinheim).

To test the adhesives, test specimens are produced from the test materials. Before the adhesive is applied, the rubber material is thoroughly roughened with grade 80 abrasive paper. The two test specimens to be bonded are coated once with the polyurethane dispersion and dried off at room temperature and the adhesive film is activated under IR lamps at 80° C., after which the test specimens are placed together in the region to be bonded and pressed under a pressure of 0.5N/mm² for 10 seconds. The peel strengths according to DIN 53,273 are determined immediately after pressing and after storage for 5 days. The high temperature strength is measured according to DIN 53,273 after the adhesive bond has been stored for 5 days. The test data for the individual polyurethane dispersions are summarized in the Table at the end of the Examples.

The following abbreviations are used in the Examples:

| | |
|---|---|
| PE ADS/H16 | adipic acid/hexane-1,6-diol polyesterol |
| PE ADS/B14 | adipic acid/butane-1,4-diol polyesterol |
| B14 | butane-1,4-diol |
| H16 | hexane-1,6-diol |
| DBTL | dibutyltin dilaurate |
| TDI | toluene diisocyanate (isomer ratio 2.4:2.6 = 80:20) |
| HDI | hexamethylene diisocyanate |
| IPDI | isophorone diisocyanate |
| MAPA | N—methyl-bis(3-aminopropyl)-amine |
| DAC salt | Na salt of N—(2-aminoethyl)-2-aminoethanecarboxylic acid (40% strength aqueous solution) |

EXAMPLE 1

A ⎡ 711 g of PE ADS/H16 (molecular weight 1777)
   72.1 g of B14
   0.1 g of DBTL catalyst
   240 g of acetone I
123.6 g of TDI
119.4 g of HDI
1000 g of acetone II
30.8 g of MAPA
25.4 g of dimethyl sulfate
1500 g of water The TDI is added to the mixture A of dewatered polyesterol, B14, acetone I and catalyst. After a reaction time of 1 hour at 65° C., the HDI is added and the reaction is carried out for a further 90 minutes. After the introduction of the acetone II, the resulting prepolymer solution has an NCO content of 0.75%.

Chain extension with MAPA is carried out at 50° C. After 5 minutes, quaternization with dimethyl sulfate is carried out at 55° C. for 30 minutes. Thereafter, the mixture is dispersed in water with stirring, after which the acetone is distilled off.

A finely divided, stable polyurethane dispersion having a solids content of 42% is obtained.

EXAMPLE 2

A ⎡ 600 g of PE ADS/H16 (molecular weight 1729)
   82.1 g of H16
   0.1 g of DBTL catalyst
   100 g of acetone I
58.2 g of TDI
222.7 g of IPDI
1080 g of acetone II
41.7 g of MAPA
21.8 g of 37% strength hydrochloric acid
2.6 g of 85% strength phosphoric acid
1520 g of water The TDI is added to the mixture A of dewatered polyesterol, H16, acetone I and catalyst. After a reaction time of 1 hour at 65° C., the IPDI is added and the reaction is carried out for a further 2 hours at 80° C. After the introduction of the acetone II, the resulting prepolymer solution has an NCO content of 1.07%.

Chain extension with MAPA is carried out at 50° C., and the hydrochloric acid and phosphoric acid are added after 5 minutes. Thereafter, the mixture is dispersed in water with stirring, after which the acetone is distilled off.

A finely divided, stable polyurethane dispersion having a solids content of 44% is obtained.

EXAMPLE 3

A ⎡ 500 g of PE ADS/H16 (molecular weight 1729)
   104.3 g of B14
   0.1 g of DBTL catalyst
   100 g of acetone I
76.0 g of TDI
290.9 g of IPDI
1090 g of acetone II
42.1 g of MAPA
22.0 g of 37% strength hydrochloric acid
2.6 g of 85% strength phosphoric acid
1540 g of water A polyurethane dispersion is prepared as described in Example 2. The reaction with the IPDI at 80° C. takes 75 minutes. The prepolymer solution has an NCO content of 1.14%. A finely divided, stable polyurethane dispersion having a solids content of 43% is obtained.

EXAMPLE 4

A ⎡ 396 g of PE ADS/H16 (molecular weight 1,800)
   79.3 g of B14
   0.2 g of DBTL catalyst
   100 g of acetone I
295.8 g of IPDI
800 g of acetone II
33.4 g of MAPA
17.5 g of 37% hydrochloric acid
2.0 g of 85% strength phosphoric acid
1200 g of water The IPDI is added to the mixture A of dewatered polyesterol, B14, acetone I and catalyst; the reaction is carried out for 3 hours at 85° C. After the introduction of the acetone II, the resulting prepolymer solution has an NCO content of 1.00%. Thereafter, chain extension is carried out, the salt is formed, the product is dispersed in water and acetone is distilled off, these steps being carried out as described in Example 2.

A finely divided, stable polyurethane dispersion having a solids content of 42% is obtained.

EXAMPLE 5

A ⎡ 360 g of PE ADS/H16 (molecular weight 1800)
   90.1 g of B14
   0.2 g of DBTL catalyst
   100 g of acetone I
318 g of IPDI
800 g of acetone II
33.4 g of MAPA -continued

| | |
|---|---|
| 17.5 | g of 37% strength hydrochloric acid |
| 2.0 | g of 85% strength phosphoric acid |
| 1200 | g of water |

A polyurethane dispersion is prepared as described in Example 4. The prepolymer solution has an NCO content of 1.03%, and the finely divided, stable polyurethane dispersion has a solids content of 39%.

EXAMPLE 6

A
| | |
|---|---|
| 582 | g of PE ADS/B14 (molecular weight 2328) |
| 45.1 | g of B14 |
| 0.2 | g of DBTL catalyst |
| 100 | g of acetone I |
| 189 | g of IPDI |
| 800 | g of acetone II |
| 43.8 | g of DAC salt solution |
| 1250 | g of water |

A solution of the prepolymer in acetone, having an NCO content of 0.47%, is prepared as described in Example 4. The DAC salt solution is added at 50° C. and the mixture stirred for 5 minutes. Thereafter, the product is dispersed in water and the acetone distilled off.

A finely divided, stable polyurethane dispersion having a solids content of 40% is obtained.

EXAMPLE 7

A
| | |
|---|---|
| 466 | g of PE ADS/B14 (molecular weight 2328) |
| 72.1 | g of B14 |
| 0.2 | g of DBTL catalyst |
| 100 | g of acetone I |
| 94.8 | g of TDI |
| 121.1 | g of IPDI |
| 800 | g of acetone II |
| 40.8 | g of DAC salt solution |
| 1200 | g of water |

A solution of the prepolymer in acetone, having an NCO content of 0.40%, is prepared as described in Example 2 (reaction with IPDI for 2.5 hours at 85° C.). The prepolymer is then subjected to chain extension and dispersed in water and finally the acetone is distilled off, these steps being carried out as described in Example 6.

A finely divided, stable polyurethane dispersion having a solids content of 40% is obtained.

COMPARATIVE EXAMPLE A

A
| | |
|---|---|
| 711 | g of PE ADS/H16 (molecular weight 1777) |
| 4.7 | g of H16 |
| 0.1 | g of DBTL catalyst |
| 180 | g of acetone I |
| 35.1 | g of TDI |
| 78.2 | g of HDI |
| 800 | g of acetone II |
| 32.4 | g of MAPA |
| 26.7 | g of dimethyl sulfate |
| 1350 | g of water |

A solution of the prepolymer in acetone, having an NCO content of 1.00%, is prepared as described in Example 1, subjected to chain extension with MAPA, quaternized with dimethyl sulfate and dispersed in water, and the acetone is distilled off. A finely divided, stable polyurethane dispersion having a solids content of 39% is obtained.

COMPARATIVE EXAMPLE B

A
| | |
|---|---|
| 750 | g of PE ADS/H16 (molecular weight 1812) |
| 37.7 | g of B14 |
| 0.1 | g of DBTL catalyst |
| 237 | g of acetone I |
| 89.7 | g of TDI |
| 86.6 | g of HDI |
| 950 | g of acetone II |
| 28.5 | g of MAPA |
| 19.4 | g of 37% strength hydrochloric acid |
| 1500 | g of water |

A prepolymer solution having an NCO content of 0.76% is prepared as described in Example 1. Thereafter, chain extension is carried out, the salt is formed, the product is dispersed in water and finally the acetone is distilled off, these steps being carried out as described in Example 2.

A finely divided, stable polyurethane dispersion having a solids content of 42% is obtained.

COMPARATIVE EXAMPLE C

A
| | |
|---|---|
| 742.2 | g of PE ADS/B14 (molecular weight 2328) |
| 0.18 | g of DBTL catalyst |
| 210 | g of acetone I |
| 35.9 | g of TDI |
| 35.2 | g of HDI |
| 850 | g of acetone II |
| 43.0 | g of DAC salt solution |
| 1320 | g of water |

The TDI is added to the mixture A of dewatered polyesterol, catalyst and acetone I. After a reaction time of 1 hour at 65° C., the HDI is added and the reaction is carried out for a further 90 minutes. After the introduction of the acetone II, the resulting prepolymer solution has an NCO content of 0.42%.

DAC salt solution is then added at 50° C. and the mixture is stirred for 5 minutes. Thereafter, the product is dispersed in water and the acetone is distilled off. A finely divided, stable polyurethane dispersion having a solids content of 40% is obtained.

| | | | Peeling values N/mm | | |
|---|---|---|---|---|---|
| | Ionic character | Mol PE/ mol diol | immediately | After 5 days | HTS °C./N |
| Example | | | | | |
| 1 | cation. | 1:2 (B14) | 2.2 | 5.0 | 60/20 |
| 2 | cation. | 1:2 (H16) | 1.4 | 4.0 | 60/20 |
| 3 | cation. | 1:4 (B14) | 1.0 | 2.9 | 90/20 |
| 4 | cation. | 1:4 (B14) | 1.6 | 3.1 | 80/30 |
| 5 | cation. | 1:5 (B14) | 1.2 | 2.6 | 90/25 |
| 6 | anion. | 1:2 (B14) | 2.5 | 4.1 | 70/20 |
| 7 | anion. | 1:4 (B14) | 1.4 | 3.0 | 80/20 |
| Comparative Example | | | | | |
| A | cation. | 1:0.1 (H16) | 1.9 | 5.2 | 50/10 |
| B | cation. | 1:1 (B14) | 1.5 | 4.3 | 50/10 |
| C | anion. | — | 1.1 | 2.3 | 50/10 |

We claim:

1. An aqueous dispersion of a polyurethane capable of forming adhesive bonds having high temperature strength and peel strength, in the absence of a crosslinking agent, which consists essentially of:
(a) at least one organic polyisocyanate, or at least one organic polyisocyanate containing up to 10 NCO equivalent % of at least one organic monoisocyanate;
(b) at least one polyester polyol having a molecular weight of from about 1,400 to 3,000;
(c) at least one difunctional amino alcohol having a molecular weight of from about 62 to 150, as a chain extender, said chain extender compound being used in an amount of from about 2 to 6 moles per mole of compound (b); and
(d) at least one compound containing ionic groups or groups which are capable of being converted into ionic groups, which compound is selected from the group consisting of diaminocarboxylic acids and diamines having at least one additional tertiary amine nitrogen atom, and the neutralized or quaternized salts thereof, wherein said compound is used in such an amount that said polyurethane contains 0.07 to 1 meq of ionic groups per gram of polyurethane.

2. The aqueous dispersion of claim 1, wherein said organic polyisocyanates have the formula X(NCO)$_2$ wherein X is an aliphatic hydrocarbon radical of 4 to 12 carbon atoms, a cycloaliphatic hydrocarbon radical of 6 to 15 carbon atoms, an aromatic hydrocarbon radical of 6 to 15 carbon atoms or an aryl aliphatic hydrocarbon radical of 7 to 15 carbon atoms.

3. The aqueous dispersion of claim 2, wherein said organic polyisocyanates are mixtures of aliphatic or cycloaliphatic and aromatic diisocyanates in a molar ratio of from 1:4 to 5:1.

4. The aqueous dispersion of claim 1, wherein said difunctional amino alcohols are selected from the group consisting of ethanolamine, isopropanolamine, methylethanolamine, aminoethoxyethanol, 3-aminopropanol, 2-aminobutane-1-ol and neopentanolamine.

5. The aqueous dispersion of claim 1, which further comprises monofunctional polyetherols or diols or a mixture thereof which have polyether side segments and each contain not less than 40% of polyethylene oxide segments in the ether chain, said polyetherols or diols having a molecular weight of from 500 to 10,000.

6. The aqueous dispersion of claim 5, which further comprises chain extender compounds being selected from the group consisting of ethylenediamine, hexamethylene diamine, piperazine, 2,5-dimethylpiperazine, 1-amino-3-aminomethyl-3,5,5-trimethylcyclohexane, 4,4'-diaminodicyclohexylmethane, 1,4-diaminocyclohexane, 1,2-diaminopropane, hydrazine, hydrazine hydrate and diethylene triamine.

* * * * *